United States Patent [19]

Nishimura

[11] Patent Number: 5,193,944
[45] Date of Patent: Mar. 16, 1993

[54] NICKED CUTTING TOOL

[75] Inventor: Takayuki Nishimura, Nara, Japan

[73] Assignee: GN Tool Co., Ltd., Nara, Japan

[21] Appl. No.: 816,955

[22] Filed: Jan. 3, 1992

[30] Foreign Application Priority Data

Jun. 20, 1991 [JP] Japan .................................. 3-148569

[51] Int. Cl.⁵ .......................... B23C 5/10; B23C 5/18
[52] U.S. Cl. ....................................... 407/53; 407/59; 407/63; 407/119
[58] Field of Search ........................ 407/53, 54, 34, 35, 407/119, 59, 63

[56] References Cited

U.S. PATENT DOCUMENTS

| 1,630,602 | 5/1927 | Blanco | 408/224 |
| 3,913,196 | 10/1975 | Maday | 407/54 |
| 4,475,850 | 10/1984 | Penoza et al. | 407/53 X |
| 5,070,748 | 12/1991 | Packer | 407/119 X |

FOREIGN PATENT DOCUMENTS 0625848 9/1978 U.S.S.R. .................................. 407/54

Primary Examiner—Steven C. Bishop
Attorney, Agent, or Firm—Koda and Androlia

[57] ABSTRACT

A nicked cutting tool enables high speed cutting in cutting process of advanced materials such as compound materials. The nicked cutting tool has a cylindrical main body with one end forming a cutting part and the other end a shank part to be mounted on a rotary driving means, and its base body is of cemented carbide. The cutting part comprises an even number of spiral twisted grooves formed on the circumferential face, lands formed between the twisted grooves, cutting edges along one edge of each land which are of sinter of high hardness nad high wear resistance and fitted and unified by sintering to the base body, plural nicks disposed on the lands and sharp outer edges formed between the nicks on the lands. The nicks on one of any two lands circumferentially adjacent to each other inclines by a specific angle with respect to the longitudinal axis, while those on the other land inclines in the opposite direction thereto, and likewise the outer edges on one of any two lands face the tip of the cutting part, while those on the other land face the shank part. The shank part is mounted to a rotary driving means and driven to only rotate without vertical reciprocation, so that cutting-up perfermance is done by the sharp outer edge formed on one of any two lands and cutting-down perfermance by those on the other land.

13 Claims, 6 Drawing Sheets

NICKED CUTTING TOOL

BACKGROUND OF THE INVENTION

1. Field of the Invention

The present invention relates to a nicked cutting tool, and more particularly to a nicked cutting tool capable of high speed cutting in cutting process of advanced materials such as compound materials.

2. Prior Art

Recently research and development has been advancing in reinforced compound materials as advanced materials. Compound materials such as fiber reinforced plastics (FRP), metal matrix compounds (MMC), whisker reinforced metals (WRM), whisker reinforced plastics (WRP), whisker reinforced ceramics (WRC), have come to be used widely, especially in the aircraft industry and the space industry, because their mechanical and physical properties are superior to those of the conventional materials.

At the same time, so-called sandwich materials or Nomex honeycomb materials which are composed of aforementioned reinforced compound materials and conventional materials such as iron, aluminum, titanium, aluminum alloy, titanium alloy and others, by gluing together with adhesives, have also come to be widely used.

In case of cutting fibrous materials of the above-mentioned reinforced compound materials, a cutting tool is required to perform differently from in process of cutting conventional materials.

For example, principal requirements include the following: (1) cutting should not cause fluff, peeling or burr in the fibrous matter area, (2) the heat generated by cutting should be smoothly transmitted to the cutting tool and released because cutting fluid or coolant cannot be used, and (3) cutting can be done at a low temperature so that rise in temperature of the workpiece does not cause the fibrous matter or adhesives to melt.

Lately, in addition to the performance requirements listed above, it has been further demanded to develop a cutting tool having a long life even if used in high speed cutting of the abovementioned fiber reinforced compound materials.

SUMMARY OF THE INVENTION

It is hence a primary object of the invention to provide a cutting tool capable of cutting fiber reinforced compound materials (1) practically without causing fluff, peeling or burr in the fibrous matter area, (2) without melting the fibrous matter and adhesives with no use of cutting fluid or coolant, and (3) with a long life in high speed cutting.

To achieve the above object, the invention provides the following technical means.

The invention presents a nicked cutting tool having a cylindrical main body with one end forming a cutting part and the other end a shank part to be mounted on a rotary driving means, and its base body is of cemented carbide. The cutting part comprises an even number of spiral twisted grooves formed on the circumferential face, lands formed between the twisted grooves, cutting edges along one edge of each land which are of sinter of high hardness and high wear resistance and fitted by sintering to the base body, plural nicks disposed on the lands and sharp outer edges formed between the nicks on the lands. The nicks on one of any two lands circumferentially adjacent to each other inclines by a specific angle with respect to the longitudinal axis, while those on the other land inclines in the opposite direction thereto, and likewise the outer edges on one of any two lands face the tip of the cutting part, while those on the other land face the shank part. The shank part is mounted to a rotary driving means and driven to only rotate without vertical reciprocation, so that cutting-up performance is done by the sharp outer edge formed on one of any two lands and cutting-down performance by those on the other land.

In the same constitution, the sinter of high hardness and high wear resistance may be of polycrystalline diamond sinter or polycrystalline cubic boron nitride sinter.

Furthermore, relieving process is conducted in the area between adjacent nicks on the lands.

The constitution as above gives the invention the following actions and effects.

1. When the tool rotates, the lands having the nicks of opposite inclinations contact alternately with a workpiece, thereby the fibers of the workpiece being securely cut off upwardly and downwardly by each twisted cutting edge and the cutting chips also being discharged smoothly.

Moreover, since the edges of portions defined by the nicks on any two lands circumferentially opposing to each other face opposite directions, the fibers of the workpiece contact with the edges on both the lands alternately and both cutting-up performance and cutting down performance are done alternately, so that a further favorable finished surface may be obtained.

2. The working of both the nicks of opposite inclinations causes to cut the fiber chips into pieces and release the heat generated by cutting, so that the temperature of the workpiece will scarcely rise and that melting of the fibrous matter and adhesives may be avoided.

3. Since the cutting edge and its vicinity in the lands are made of sinter of high hardness and high wear resistance, higher in hardness and wear resistance than the cemented carbide sinter, and the base metal which is the part of the main body other than the cutting edges and its vicinity is made of cemented carbide sinter, and then the sinter of high hardness and high wear resistance is sintered to affixed and unified to the cemented carbide sinter, thereby the cutting edge being very excellent in wear resistance and not being off from the base metal. As a result, thus constituted cutting tool enables high speed cutting and has a long life as a cutting tool.

In case that relieving process is given to the area between adjacent nicks on the lands, the cutting resistance decreases, and much faster cutting is achieved.

DETAILED DESCRIPTION OF THE INVENTION

Figure 1:
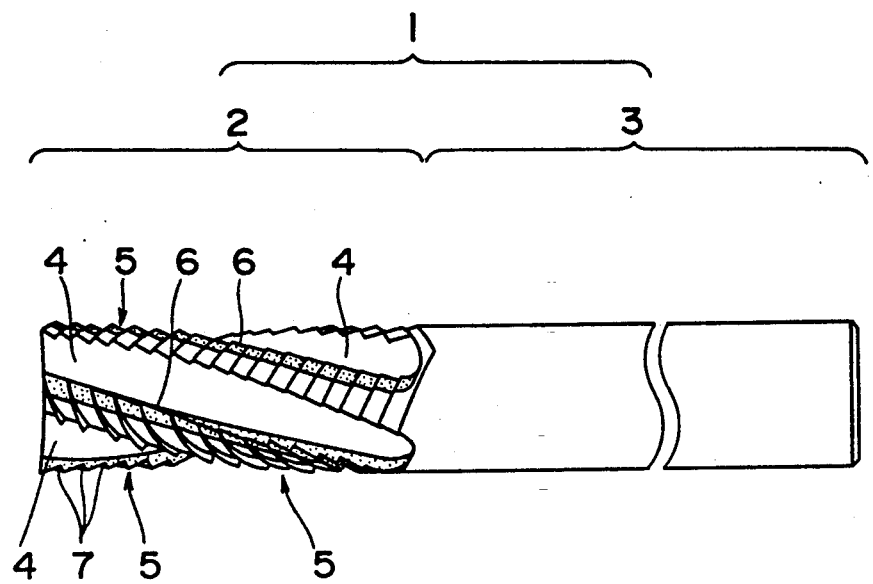
FIG. 1 is a partly omitted plan view of an end mill of a first embodiment of a nicked cutting tool of the invention.

Referring now to the drawings, some of the embodiments of the invention are described in detail below.

FIG. 1 to FIG. 4 show a first embodiment of a nicked cutting tool of the invention, in which the embodiment is composed as an end mill.

An end mill 1 is composed of a straight cutting part 2 and a shank part 3, and the cutting part 2 is provided with four twisted grooves 4 disposed at equal intervals in the circumferential direction and four twisted lands 5 formed by these four twisted grooves 4. At the edge of the cutting side of each land 5 (the left side edge as seen from the tip side of the cutting part 2), a twisted cutting edge 6 made of a high hardness sinter (polycrystalline diamond sinter, polycrystalline cubic boron nitride sinter) is disposed.

Therefore, the cutting edge 6 of this tool is not a smooth continuous edge, but is composed of multiple small edges 6 defined by nicks 7.

Figure 6:
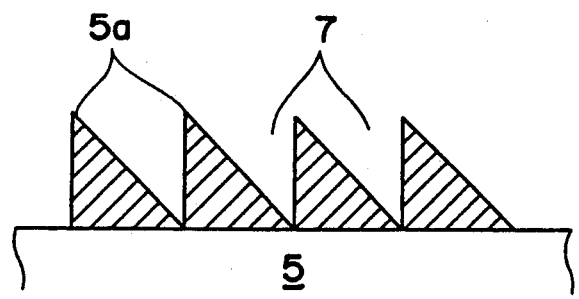
FIG. 6 shows that the section of nicks is a sawtoothed shape.

A series of nicks on each land 5 has a section of so-called sawtooth profile, or a series of section of longitudianally asymmetric, approximately right triangle profile, as shown in FIG. 6, and the plural nicks are disposed on each land 5 at a specific pitch. In this embodiment, the pitch of each nick 7 is set equal to the width of the nick 7. The pitch of the nicks means the distance or length between the portions of the nicks which are next to each other in the direction of the axis of the cutting tool. And therefore smoothly curved surface does not exist on each land 5, but multiple sharp edges 5a are arranged at a specific pitch. Accordingly, twisted cutting edge 6 on each lands is composed of a series of the sawtooth short cutting edges defined by the nicks.

In this embodiment, the nicks 7 are provided along a twisted line forming an angle $\alpha$ with regard to the longitudinal axis of the end mill 1, and all of them are inclined by the same angle $\alpha$ to the longitudinal axis, but the exact directions of inclination thereof are slightly different from nick to nick. The nicks 7 provided on two lands 5 opposite to each other with regard to the longitudinal axis of the end mill 1 (the front side land and the back side land) are inclined in the same direction, while the nicks 7 on two lands 5 adjacent in the circumferential direction are inclined in the opposite directions.

Figure 8:
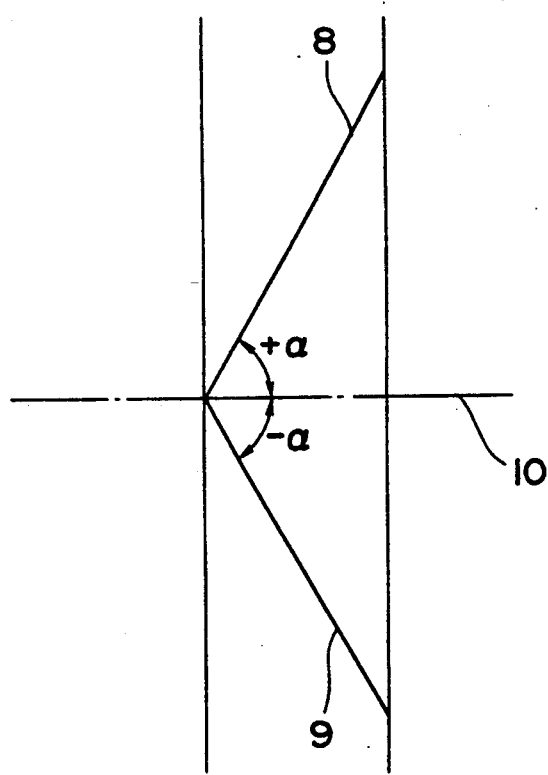
FIG. 8 is an explanatory diagram showing the relation in inclinating direction and angle between the nicks in two lands circumferentially adjacent to each other.

This relation is schematically illustrated in FIG. 8. In this diagram, lines 8, 9 are straight lines (tangents) drawn along the nicks 7 disposed on two adjacent lands 5 in the circumferential direction; one line 8 forms an angle $+\alpha$ with regard to the longitudinal axial line 10 of the end mill 1, while the other line 9 forms an angle $-\alpha$ with regard to the longitudinal axial line 10. This relation holds true also for the nicks 7 of any other two adjacent lands 5.

The nicks 7 have a sectional profile of a sawtooth form, but all of the sharp outer edge 5a defined by plural nicks 7 on the lands 5 are directed in different directions. Similar relation in the inclination angles can be seen in the directions of the sharp outer edges 5a. That is, in two lands 5 opposite to each other with regard to the longitudinal axis of the end mill 1 (the front side land and the back side land), the outer edges 5a are in the same direction, while in two lands 5 adjacent in the circumferential direction, they are in opposite directions. This relation is clearly shown in FIG. 3.

Figure 3:
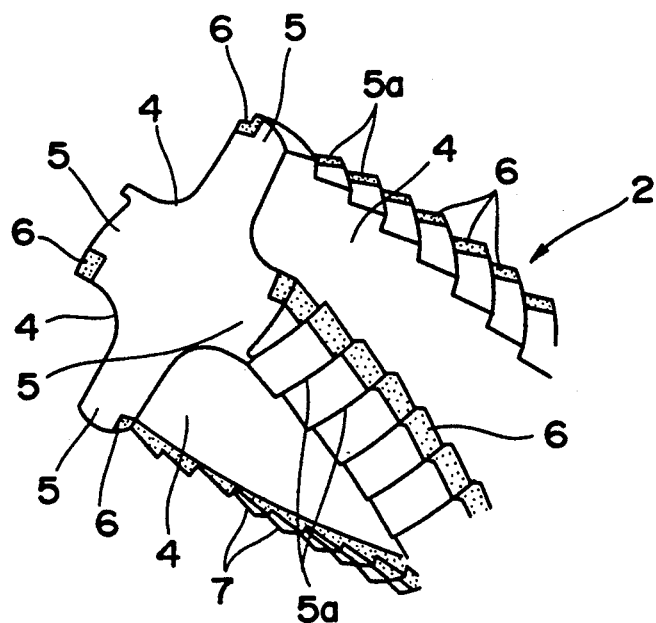
FIG. 3 is a partly enlarged perspective view of the tip of the same end mill.
Figure 4:
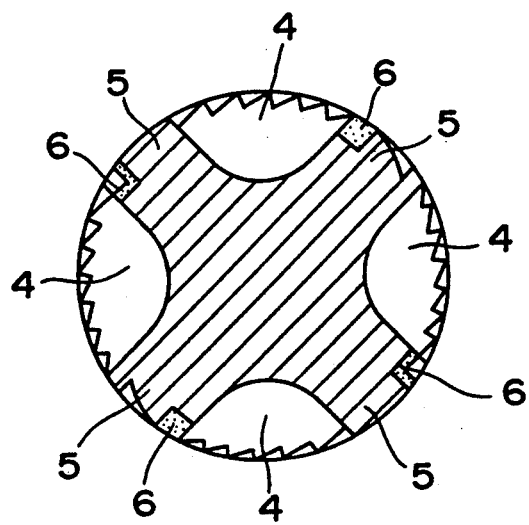
FIG. 4 is a sectional view of a cutting part of the same end mill.
Figure 7:
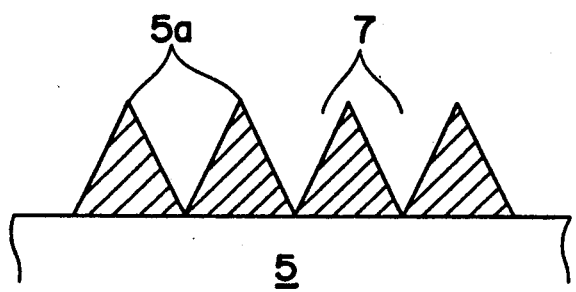
FIG. 7 shows that the section of nicks is an angulartoothed shape.

The sharp outer edges 5a on the lands 5 both at upper right and lower left in FIG. 3 face backward, or toward the shank part 3, while the sharp outer edges on the land in front in FIG. 3 face forward, or toward the tip of the cutting part 2. Although not well shown in the drawing, the outer edges 5a of the land 5 at the back side face also forward. In other words, the nicks 7 on any two lands 5 opposite with regard to the longitudinal axis of the end mill 1 are formed so that their outer edges 5a face the same direction, while the nicks 7 on any two lands 5 adjacent in the circumferential direction are formed so that their outer edge 5a face opposite directions. In this embodiment, meanwhile, the section of the nicks 7 is an asymmetric right triangular saw-tooth profile, however a symmetrical equilateral trianguler profile as shown in FIG. 7 may also be formed. Furthermore other shapes according to required performance may naturally be formed.

A clearance is provided between the nicks next to each other on each of the lands when forming the nicks 7 on the lands 5, which results in reducing cutting resistance as well as releasing the heat caused by cutting.

Figure 9:
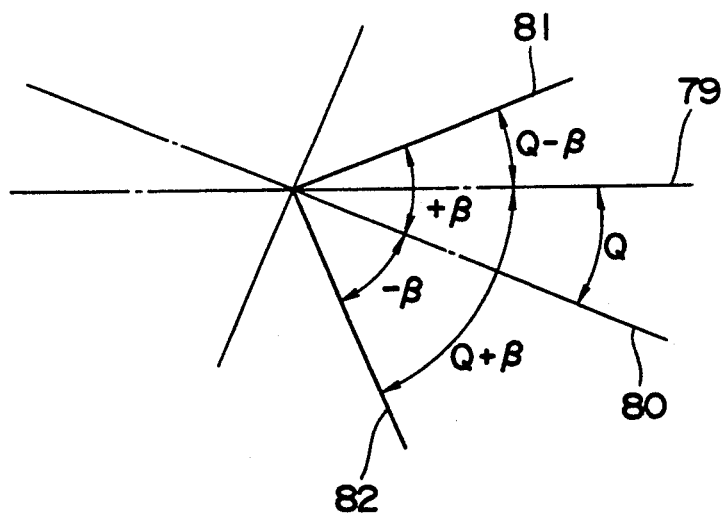
FIG. 9 is another explanatory diagram showing the relation in inclination direction and angle between the nicks in two lands circumferentially adjacent to each other.

On the other hand, as shown in FIG. 9, the nicks 7 may be formed so as to be symmetric with respect to the tangent of the twisted line of the twisted groove 4, instead of being inclined by a specific angle to the longitudinal axis. The tangent of the twisted line is inclined by the twisting angle (Q) with respect to the longitudinal axial line 79 of the tool. Straight lines 81, 82 are the tangents respectively drawn along the nicks 7 of two adjacent lands 5. As shown clearly in FIG. 9. The straight line 81 drawn along the nicks 7 on one of the two land 5 forms an angle $+\beta$ with regard to the tangent 80 of the twisted line, while the straight line 82 drawn along the nicks 7 on the other land 5 forms an angle $-\beta$. Therefore, the nicks on the two lands 5 are disposed symmetrically with regard to the tangent 80 of the twisted line.

The tangent 80 of the twisted line is inclined by a twisting angle Q with regard to the longitudinal axial line 79, and therefore the straight lines 81 and 82 are inclined respectively by an angle $Q-\beta$ and by an angle $Q+\beta$ with regard to the longitudinal axial line 79.

Thus, the inclination of the nicks 7 may be symmetrical with regard to either the longitudinal axial line of the tool or the twisted line of the twisted groove.

Figure 5:
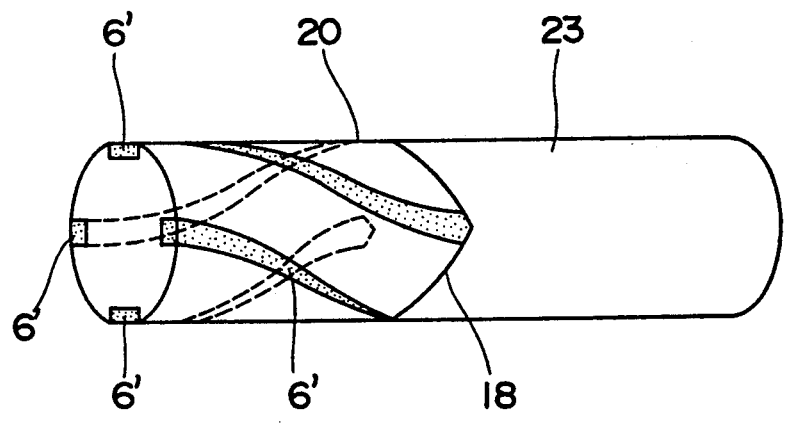
FIG. 5 is a perspective view of a main body having the sintered base metal with its twisted grooves filled with sinter of high hardness and high wear resistance, the base metal being bonded to a shank member.

FIG. 5 is a drawing of the material applied to the tool of the invention. The material comprises a base metal sinter 20 of cutting part 23 made of cemented carbide and a sinter 6 of high hardness and high wear resistance filled in and affixed by sintering (unified) to the twisted groove on the outer circumference, and is bonded 18 to a shank member made of cemented carbide.

Figure 2:
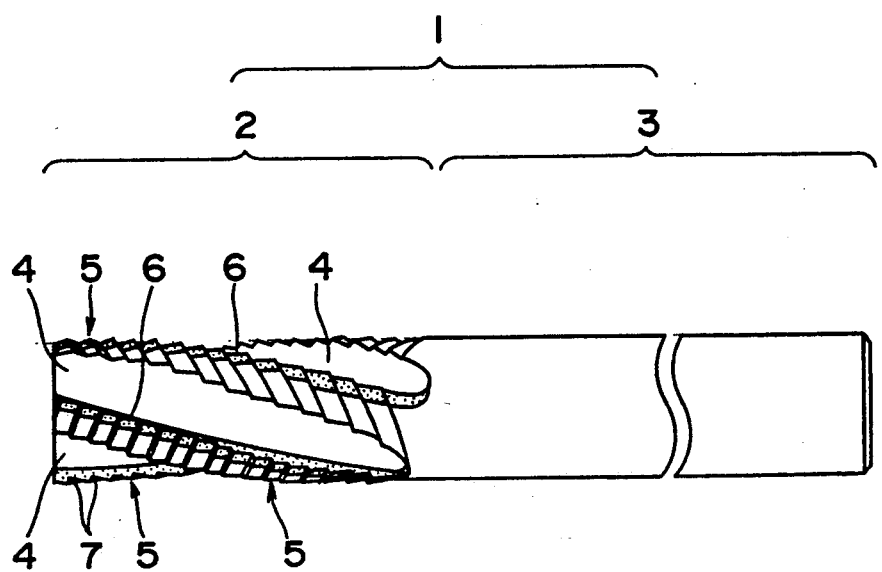
FIG. 2 is a partly omitted front view of the same end mill.

Since the base metal sinter 20 of this material is made of cemented carbide, in processing of the twisted grooves 4 and lands 5, first the part made of ordinary cemented carbide is grinded, then the sinter 6' of high hardness and high wear resistance is finished accurately and precisely by discharge cutting or electrolytic grinding, thereby fabricating the end mill as shown in FIGS. 1 and 2.

The invention may be also applied to other cutting tools such as drills as well as to the end mills described above.

What is claimed is:

1. A nicked cutting tool having a cylindrical main body with one end forming a cutting part and the other end a shank part to be mounted on a rotary driving means, its base body being of cemented carbide, the cutting part comprising:
an even number of spiral twisted grooves formed on its circumferential face,
lands formed between the twisted grooves,
cutting edges along one edge of each land, being of sinter of high hardness and high wear resistance and fitted and unified by sintering with the base body,
plural nicks disposed on the lands, the nicks on one of any two lands circumferentially adjacent to each other being inclined by a specific angle with respect to the longitudinal axis, the nicks on the other land being inclined in the opposite direction thereto, and
sharp outer edges formed between the nicks on the lands substantially parallel to the nicks, the outer edges on one of any two lands facing the tip of the cutting part, the outer edges on the other land facing the shank part,
wherein the shank part is mounted to the rotary driving means and driven to only rotate without vertical reciprocation along the longitudinal axis of the means, thereby cutting-up performance being done by the sharp outer edges on one of any two lands and cutting-down performance being done by the sharp outer edges on the other land.

2. A nicked cutting tool according to claim 1, further comprising a circumferential clearance provided between the nicks next to each other on each of the lands.

3. A nicked cutting tool according to claim 1, wherein the sinter of high hardness and high wear resistance is made of polycrystalline diamond sinter or polycrystalline cubic boron nitride sinter.

4. A nicked cutting tool according to claim 2, wherein the sinter of high hardness and high wear resistance is made of polycrystalline diamond sinter or polycrystalline cubic boron nitride sinter.

5. A nicked cutting tool according to claim 1, wherein the nicks are inclined by a nearly equal angle with respect to the longitudinal axis of the tool.

6. A nicked cutting tool according to claim 2, wherein the nicks are inclined by a nearly equal angle with respect to the longitudinal axis of the tool.

7. A nicked cutting tool according to claim 3, wherein the nicks are inclined by a nearly equal angle with respect to the longitudinal axis of the tool.

8. A nicked cutting tool according to claim 4, wherein the nicks are inclined by a nearly equal angle with respect to the longitudinal axis of the tool.

9. A nicked cutting tool according to claim 1, wherein the nicks are inclined by a nearly equal angle with respect to a twisted line of the twisted grooves.

10. A nicked cutting tool according to claim 2, wherein the nicks are inclined by a nearly equal angle with respect to a twisted line of the twisted grooves.

11. A nicked cutting tool according to claim 3, wherein the nicks are inclined by a nearly equal angle with respect to a twisted line of the twisted grooves.

12. A nicked cutting tool according to claim 4, wherein the nicks are inclined by a nearly equal angle with respect to a twisted line of the twisted grooves.

13. A nicked cutting tool according to claim 1, wherein the pitch of the nicks is equal to the width of the nicks.

* * * * *